March 3, 1931.  H. M. ZELTNER  1,794,816
GRAND PIANO CASE
Filed Aug. 4, 1930    3 Sheets-Sheet 1

March 3, 1931.  H. M. ZELTNER  1,794,816
GRAND PIANO CASE
Filed Aug. 4, 1930   3 Sheets-Sheet 3

WITNESSES

INVENTOR
Harry M. Zeltner
BY Herschel E. Tower
ATTORNEY

Patented Mar. 3, 1931

1,794,816

UNITED STATES PATENT OFFICE

HARRY M. ZELTNER, OF CINCINNATI, OHIO, ASSIGNOR TO THE BALDWIN COMPANY, OF CINCINNATI, OHIO

GRAND-PIANO CASE

Application filed August 4, 1930. Serial No. 472,829.

Grand piano cases have been made of the same general shape since the first one was invented and had all the parts such as a two piece top, hidden music desk when closed and a fall board to cover the keys, these parts only varying slightly in design.

One object of my invention is to simplify the manufacture of a grand piano so the cost can be reduced and also make it much handier for playing as the only thing necessary to do is raise the back top and the music rest.

There is also an advantage in having the front top fastened as it covers the tuning pins and other working parts that are necessarily shown where the front top is made to fold onto the back top.

Figure 1:
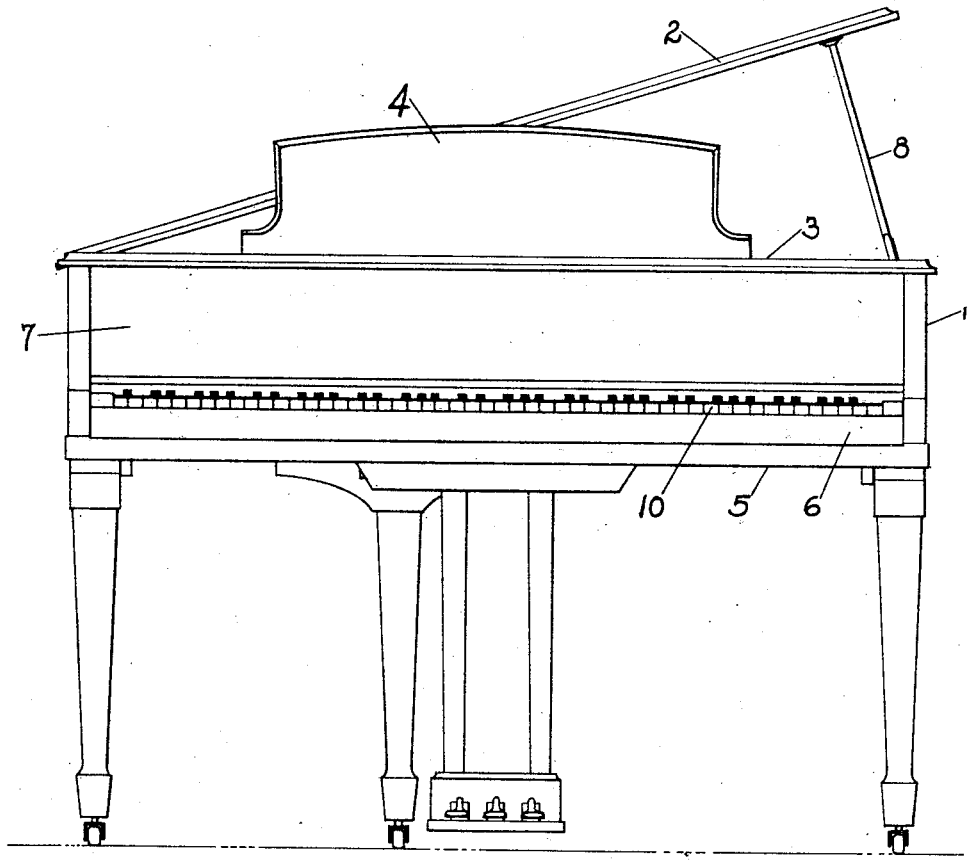
Figure 2:
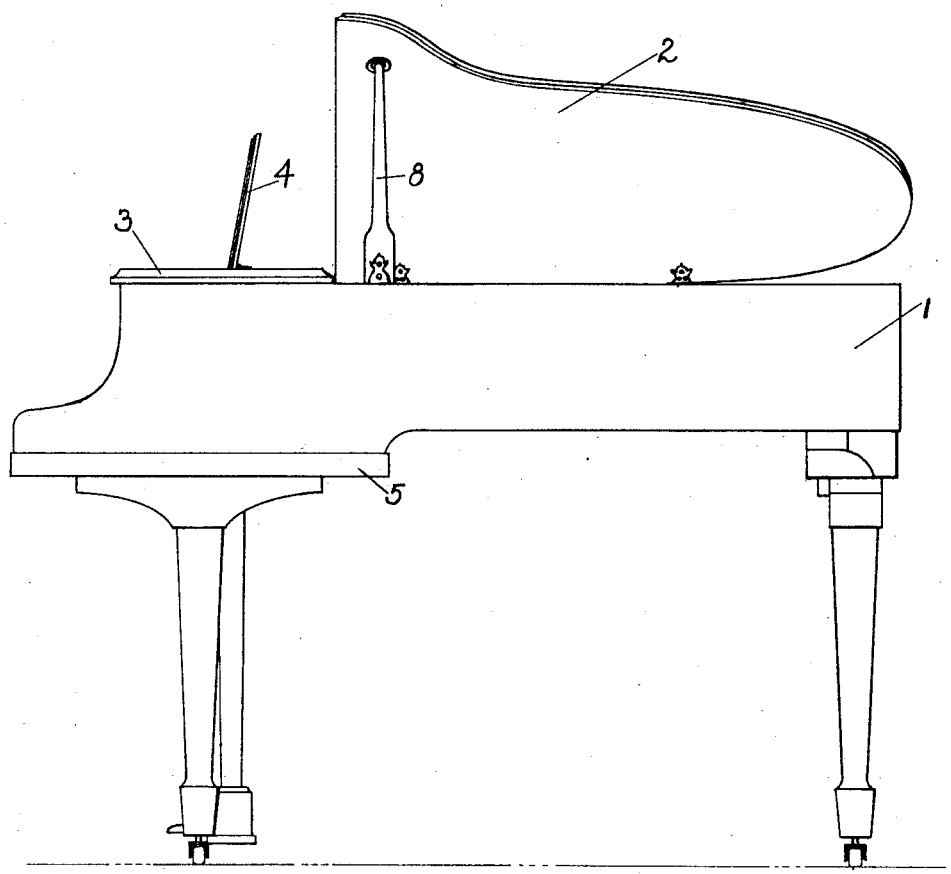
Figure 3:
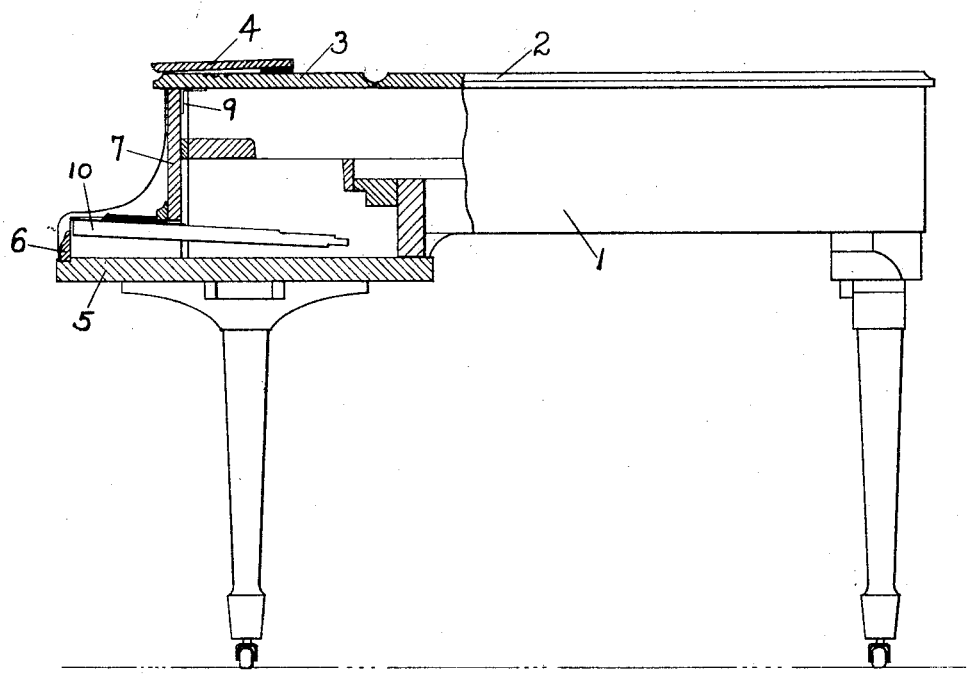

In the drawings Fig. 1 is a view from in front of the piano with the music rest raised to support the music and the back top raised to give more volume. Fig. 2 is a view from the side showing the raised parts in the same position as Fig. 1. Fig. 3 is a sectional view showing the relation of the different parts as affected by this invention.

A grand piano case is made up of a rim 1, back top 2, front top 3, music rest 4, keybed 5, front strip 6 and front board 7.

In the present invention the back top 2 is hinged to the rim 1 so it can be raised or lowered sideways and has a lid prop 8 for holding it up so the sound from the strings of the piano will be unhampered. The front top 3 is rigidly secured to the rim 1 on each side. A front board 7 is secured to the front top 3 by any well known design of bracket such as bracket 9. By this arrangement the works of the piano except the keys 10 are always covered up and less room is taken up as a fall board is dispensed with. On top of the front top 3 is mounted a music rest 4 that can be raised to hold up music sheets or can be lowered when not in use.

By this arrangement and elimination of part a very simple and cheap form of construction can be obtained and yet be artistic.

Many modifications in design may be made but what I claim as my invention is:

1. A grand piano case having a rim and a split top, the front of the top being securely fastened to the rim, a front panel extending from the front top to the keys and a music rest hinged on top of the front top.

2. A grand piano case having a rim and a split top, the front of the top being unmovably fastened to the rim, a front panel extending from the front top to the keys and a music rest movably mounted on top of the front top.

3. A grand piano case having a rim and a split top, the front of the top being secured to the rim, a front panel extending from the front top to the keys and unmovably secured to the rim and front top and a music rest movably mounted on top of the front top.

4. A grand piano having a rim and a split top, the rear part of the split top being movably mounted and the front part of the split top being secured to the rim, a non-movable front panel extending from the top to the top of the keys and a music rest mounted on top of the secured part of the split top.

HARRY M. ZELTNER.